United States Patent [19]

Allen et al.

[11] 4,168,232

[45] Sep. 18, 1979

[54] METHOD AND APPARATUS FOR RECYCLING WATER IN A CAR WASH

[76] Inventors: Mark K. Allen, 1120 Granvia Altamira, Palos Verdes Estates; Roland S. Weber, 32201 Valor Pl., Rancho Palos Verdes, both of Calif. 90274

[21] Appl. No.: 858,651

[22] Filed: Dec. 8, 1977

[51] Int. Cl.$^2$ .................. B01D 37/00; B04C 9/00
[52] U.S. Cl. .......................... 210/74; 210/84; 210/167; 210/194; 210/512 R; 15/DIG. 2
[58] Field of Search ............. 210/73 R, 73 S, 73 W, 210/74, 83, 84, 130, 167, 194, 196, 294, 512 R, 513, 532 A, 5, 136; 15/DIG. 2

[56] References Cited

U.S. PATENT DOCUMENTS

| 2,324,763 | 7/1943 | Carruthers | 210/74 X |
| 2,381,760 | 8/1945 | Latham, Jr. | 210/74 |
| 2,706,045 | 4/1955 | Large | 210/512 R |
| 2,928,268 | 3/1960 | Hetzer | 210/167 X |
| 3,263,341 | 8/1966 | Allen | 15/DIG. 2 |
| 3,543,932 | 12/1970 | Rastatter | 210/512 M |
| 3,774,625 | 11/1973 | Wiltrout | 210/167 X |
| 3,923,658 | 12/1975 | Lancaster | 210/167 X |

Primary Examiner—William A. Cuchlinski, Jr.
Attorney, Agent, or Firm—Lewis B. Sternfels; Noel B. Hammond

[57] ABSTRACT

Water from existing clarifier tank is pumped to a centrifugal separator where solid particles are removed. A bypass valve is disposed between the outlet of the separator and the inlet of the pump to keep the separator operating at high velocity even when there is little or no demand for processed water. A vortex breaker is provided at the sludge outlet of the separator to prevent solid particles from being carried to the processed water outlet to the separator. A valve is provided at the outlet of the vortex breaker to prevent vacuum lock when the pump is turned off, and a priming valve is provided to prime the pump. A float tank and check valve may also be provided for expelling trapped air from the system. Two or more centrifugal separators may be employed in parallel when a higher volume of processed water is required.

7 Claims, 4 Drawing Figures

METHOD AND APPARATUS FOR RECYCLING WATER IN A CAR WASH

BACKGROUND OF THE INVENTION

At the present day we are faced with drought conditions and also the necessity for conservation of energy. Authorities in several states have already rationed water, and others are preparing to do so soon. Accordingly, to conserve water in the operation of a car wash is now highly desirable in order to stay in business. In addition, when the customers are aware that the water is being recycled, their reluctance to have their cars washed out of sense of duty tends to be overcome. Thus the car wash volume can be kept high in spite of the drought or rationing.

Also, when the customers are aware that the recycled water in the car wash is being cleaned, thy will not be afraid that their cars' finish will be ruined by dirt particles. They will have the assurance that even fine particles which might cause damage to a car's finish have been removed in the recycling process.

Even if rationing to postponed or only temporary, recycling water and soap can be profitable. Water costs can be cut up to 60% and soap costs can be cut up to 90%. Such savings can pay for a water reclaim unit in a matter of months.

Accordingly, an object of the present invention is to provide a simple and reliable water reclaim unit which will provide a continuous supply of cleaned or processed water to scrubbing areas as well as the pre-rinse area of a car wash. Depending on the car wash system, a supply of between 60 and 120 gallons per minute will be required.

Another object of the invention is the provision of a water reclaim unit which has few moving parts, and does not require the cleaning of filters, backwashing and disassembly.

SUMMARY OF THE INVENTION

In accordance with these and other objects of the invention, there is provided a water reclaim unit having a pump which draws water from the existing clarifying tank by way of a foot valve, and provides it to a centrifugal separator where, in one continuous action, solid particles are expelled and discharged. To keep the separator always operating at high velocity even when the demand for processed water is small or absent, a bypass valve connects the outlet of the separator to the inlet of the pump. A vortex breaker is provided at the solid discharge outlet of the separator to prevent dirt particles from being carried to the processed water outlet of the separator. A valve is provided at the outlet of the vortex breaker to prevent the formation of a vacuum lock after the water reclaim unit is turned off. A priming valve may be provided to prime the pump. A float tank and check valve may also be provided for expelling trapped air from the system. Gauges may be provided at the outlet of the separator and at the outlet of the pump. The pressure indicated by the gauges may be used to calculate the volume of water being bypassed or the volume of water being used by the car wash. For higher volume, twin centrifugal separators connected in parallel may be used.

BRIEF DESCRIPTION OF THE DRAWINGS

The foregoing and other objects and features of the present invention can be more readily understood with reference to the following detailed description, taken in conjunction with the accompanying drawings, wherein like reference numerals designate like structural elements, and in which.

DETAILED DESCRIPTION OF THE INVENTION

Figure 1:
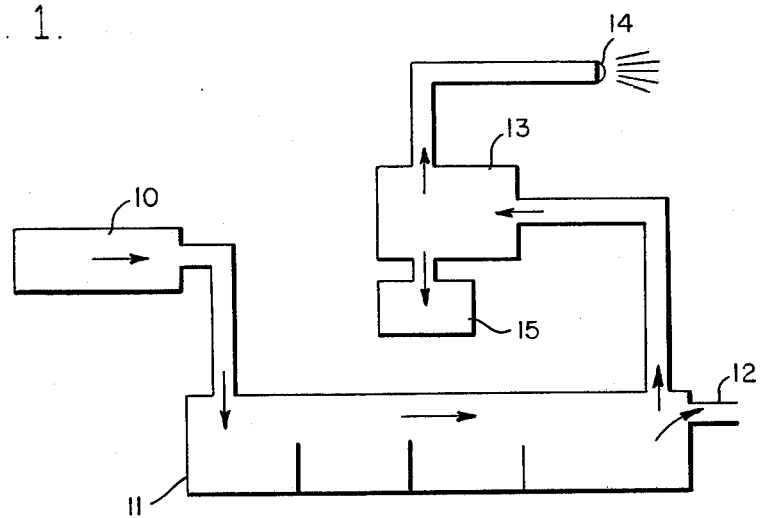
FIG. 1 is a diagram of the drain system of a conventional car wash having an embodiment of the water reclaim unit of the present invention installed therein.

Referring now to FIG. 1 of the drawings, there is shown a diagram of the drain system of a conventional car wash having an embodiment of the water reclaim unit of the present invention installed therein. Arrows indicate the direction of flow in the system. The car wash drain system is provided with an existing drain trench 10 which collects the soiled water which runs from the cars being washed. In actual practice, there is usually more than one drain trench 10 running the full length of the car wash.

The soiled water is conducted from the drain trench 10 to an existing clarifying tank 11, from which it drains through a sewer outlet 12 into the city sewage system. The clarifying tank 11 is usually required by city regulations to remove dirt particles from the water prior to its discharge into the city sewage system. It comprises a series of settling tanks separated by baffles.

A water reclaim unit 13, in accordance with the present invention, pumps soiled water from usually the last, or next to the last, section of the clarifying tank 11. The water reclaim unit 13 cleans the soiled water and provides the processed water to the scrubbing section of the car wash, indicated in FIG. 1 as a nozzle 14 emitting a spray. The solid particles which are removed from the soiled water by the water reclaim unit 13 may be discharged into a sump or sludge receptacle 15.

Depending on the specific gravity of the solid particles contained in the soiled water, the water reclaim unit 13 may remove particles as small as substantially 10 microns. Such particles may consist of ferrous, and heavy non-ferrous materials. Lighter particles as small as substantially 70 microns are also removed. Soap usually remains in the processed water so that if it were used in the final rinse section of the car wash it would tend to leave a soap film on the car. Accordingly, fresh water, rather than processed water, is generally used in the final rinse area. The processed water is used in the scrubbing areas, which are conventionally the pre-rinse, brush and curtain areas of the car wash.

By employing the water reclaim unit 13 of the present invention, water costs are cut up to substantially 60%, and soap costs are cut up to substantially 90%. At the same time, the water reclaim unit 13 protects the finish of the cars being washed. If the soiled water is recycled without first removing the solid particles, it may cause a sandblasting effect in the pre-rinse area, and a sandpaper effect in the brush and curtain areas. Ferrous particles, and certain non-ferrous particles such as sand, tend to adhere to brushes and curtains, where they eventually become embedded, acting much like sandpaper.

Figure 2:
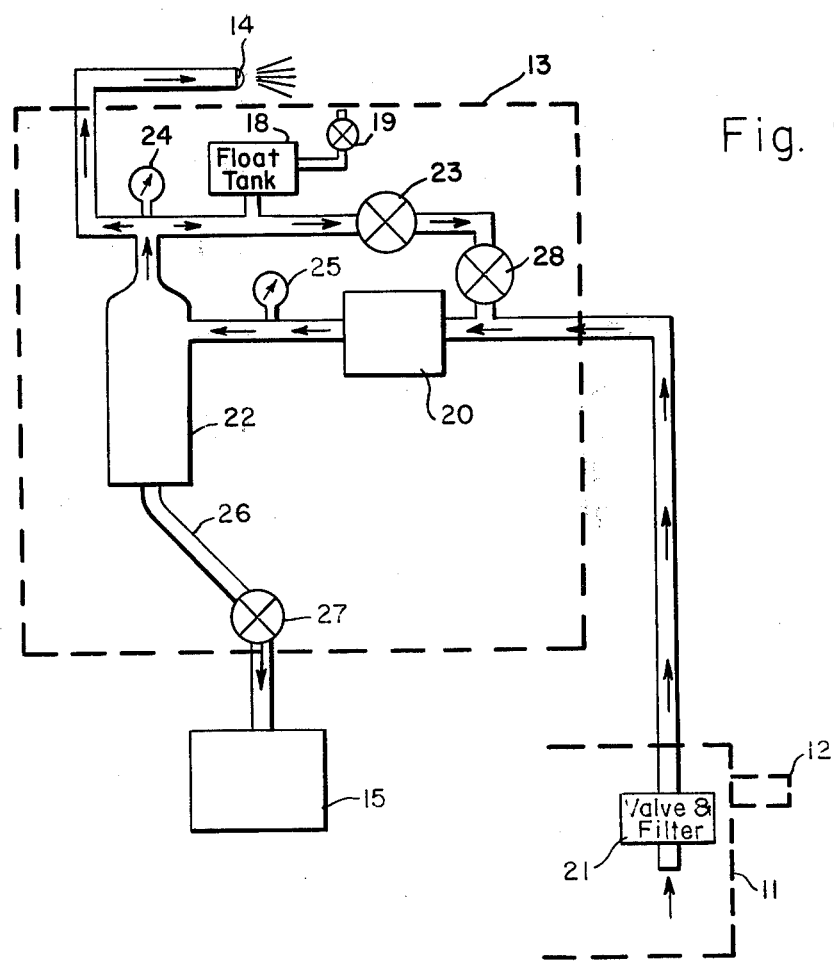
FIG. 2 is a diagram of the water reclaim unit of FIG. 1 showing the elements thereof and their interconnections.

Referring now to FIG. 2 of the drawings, the water reclaim unit 13 includes a pump 20 which pumps soiled water from the clarifying tank 11. The soiled water is drawn into the water reclaim unit 13 through a foot valve 21 which is located in the clarifying tank 11. The foot valve 21 comprises a strainer or screen and a check valve. A flexible hose may be used to connect the check valve to a float and pickup tube. The purpose of the flexible hose is to enable the water pickup tube and float to follow the varying water level in the clarifying tank 11. The inlet of the pickup tube is disposed so as to admit water far enough below the surface so as not to ingest the sludge floating on the surface of the water in the clarifying tank 11.

The pump 20 pumps the soiled water to the inlet of a high-velocity, centrifugal separator 22. Here, the dirty water whirls at high velocity, creating a central vortex in the separator 22 from top to bottom. Solid-particle separation occurs at the circumference of the water stream, where gravity causes the solid particles to fall toward the bottom of the separator 22. At the center of the vortex, a powerful upward force is generated which rapidly elevates cleaned or processed water to the outlet of the centrifugal separator 22. From this outlet, the processed water is conducted to the scrubbing section of the car wash, indicated by the nozzle 14 emitting a spray.

As is known in the art, the scrubbing section of the car wash includes a number of valves which are operated by cars passing through the car wash. Consequently, the demand for water from the water reclaim unit 13 is intermittent. When no cars are being washed, or when the cars are passing from area to area of the car wash, no water is turned on. To keep the centrifugal separator 22 continuously operating at high velocity even when no processed water is being supplied to the car wash, a bypass valve 23 connects the outlet of the separator 22 to the inlet of the pump 20.

The bypass valve 23 causes the water to recirculate in a loop including the pump 20, the separator 22, and the bypass valve 23. The bypass valve 23 is usually adjusted so that there is substantially a 4-pound pressure drop across the separator 22, which provides substantially a 50 gallon-per-minute flow rate in the recirculating loop at standby, that is, with no demand from the car wash. The substantially 50 gallon-per-minute flow rate keeps the separator 22 operating at full efficiency regardless of the demand from the car wash. The full capacity of the water reclaim unit 13 with a 5 horsepower pump 20 is approximately 80 gallons-per-minute. With anything less than the full 80 gallon-per-minute demand from the car wash, up to substantially 100% of the water recirculates through the separator 22 again and again, which causes it to be up to substantially 99% efficient at cleaning the particulate matter from the processed water.

A first water pressure gauge 24 may be provided at the outlet of the centrifugal separator 22, and a second water pressure gauge 25 may be provided at the inlet to the separator 22. The pressure indicated by the gauges 24, 25 may be used to calculate the volume of water being bypassed, or the volume of water being used by the car wash.

A vortex breaker 26 is provided at the bottom of the centrifugal separator 22, and comprises a pipe inclined at an angle to the vertical. Solid particles are continuously flushed through the vortex breaker 26 to the sump or sludge receptacle 15. The vortex breaker 26 breaks the vortex at the sludge outlet and thus prevents solid particles from being sucked up the vortex to the outlet of the separator 22.

A valve 27 may be provided between the vortex breaker 26 and the sump or sludge receptacle 15 to allow passage of water carrying dirt particles only when the water reclaim unit 13 is operating. If water drains out of the separator 22 when the water reclaim unit 13 is not operating, it causes a vacuum lock which prevents the pump 20 from operating when the water reclaim unit 13 is restarted. A priming valve 28 may be provided between the bypass valve 23 and the pump 20 to prime the pump 20.

In addition to the aforementioned problem of the possibility of water draining out of the separator 22, there is also the possibility that a piece of brush bristle or other foreign object can lodge in the check valve portion of the foot valve 21 and keep the check valve partly open. Under this condition, when the pump 20 stops, it is possible for the pump 20 to lose its prime. Because of the nature of the integral bypass system, air would be recirculated and the pump 20 would be operating air locked.

To overcome this problem, a float tank 18 comprising a chamber having a float valve may be provided if desired above the outlet line of the separator 22. The float valve in the float tank 18 opens the system to the atmosphere when the water level in the float tank 18 drops. When the pump 20 is started with the water level low in the float tank 18, the trapped air is expelled until the water level rises and shuts off the float valve. A check valve 19 may be disposed between the float tank 18 and the atmosphere to prevent air being drawn into the system when the water level in the float tank 18 is low. Drawing air into the system would aggravate the air lock problem.

Figure 3:
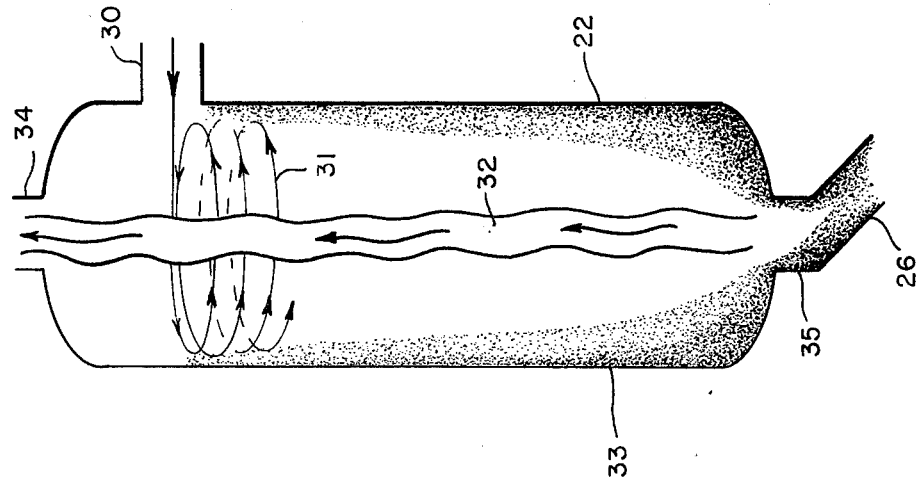
FIG. 3 is a drawing of a centrifugal separator employed in the water reclaim unit of FIGS. 1 and 2, showing its mode of operation.

FIG. 3 illustrates the operation of the high-velocity centrifugal separator 22. It is comprised of a heavy-duty, steel, cylindrical, tank-like chamber having the inlet 30 near the top at one side. Dirty water pumped into the separator 22 whirls at high velocity around the sides of the separator 22 from near the top towards the bottom. This centrifuge action is indicated at 31. As previously stated, this creates a central vortex 32 from top to bottom. Gravity causes solid particles 33 at the circumference of the separator 22 to separate and fall toward the bottom as the intensity of the centrifugally whirling water increases. At the center of the vortex 32 a powerful upward force is created which rapidly elevates the cleaned water to the outlet 34 at the top of the separator 22. The solid particles 33 are fushed out the solid-discharge outlet 35 at the bottom of the separator 22 and through the vortex breaker 26, which prevents solid particles from being sucked up the vortex 32 to the outlet 34.

Figure 4:
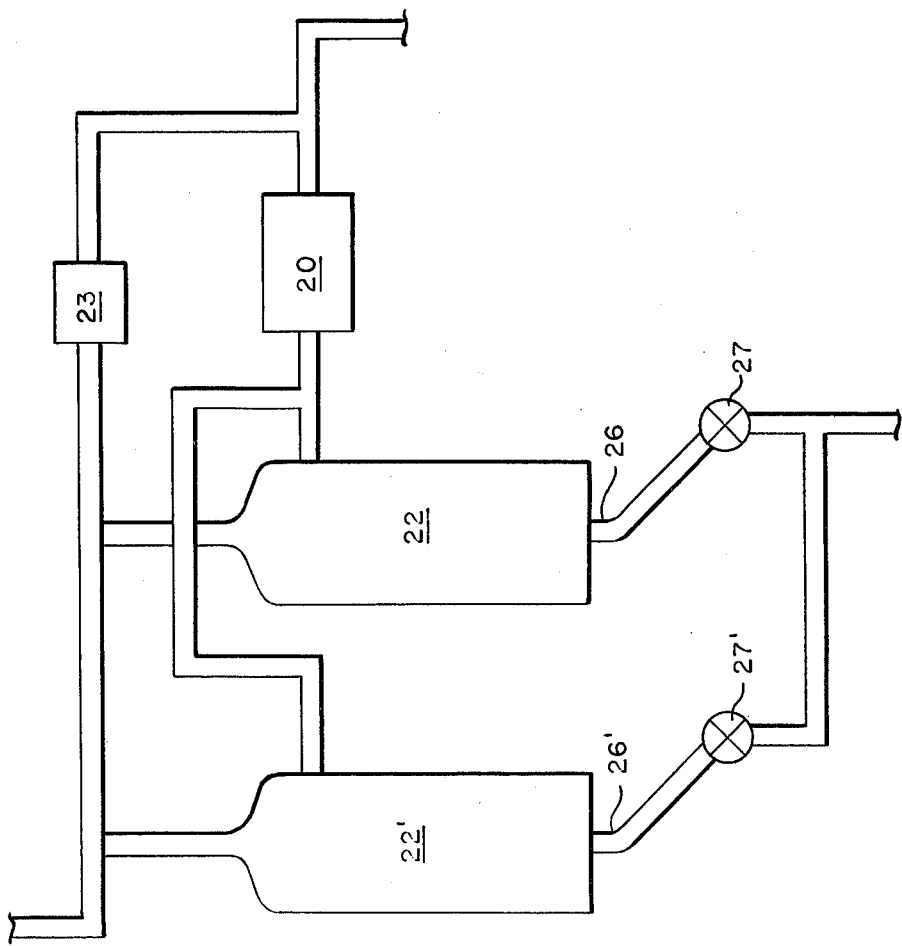
FIG. 4 is a diagram of a second embodiment of the invention having twin centrifugal separators operating in parallel.

FIG. 4 shows a second embodiment of the invention in which the outlet of the pump 20 is also connected to the inlet of the second separator 22' to provide twin separators 22, 22' operating in parallel. The second separator 22' is provided with its own vortex breaker 26' and sludge valve 27'. The outlet of the second separator 22' is also connected to the by-pass valve 23 and to the car wash. Whereas the first embodiment of the invention employing a single separator 22 has a capacity of 80 gallons-per-minute at 50 PSI using a 5 horsepower pump 20, the second embodiment employing the twin centrifugal separators 22, and 22' has a capacity of 160 gallons-per-minute at 50 PSI using a 10 horsepower pump 20.

The only moving parts in the water reclaim unit 13 are the pump and valves. The water is cleaned in a simple, continuous, centrifugal action without using filters or screens which must be cleaned or backwashed, and which may require disassembly. Thus, the unit of the present invention is practically maintenance-free, simple and dependable. The savings in water and soap makes the unit of the present invention pay for itself in time. The only water loss occurs through carry-off, overflow and evaporation.

It is to be understood that the above-described embodiments of the invention are merely illustrative of the many possible specific embodiments which represent applications of the principles of the present invention. Numerous and varied other arrangements can be readily devised in accordance with these principles by those skilled in the art without departing from the spirit and scope of the invention.

What is claimed is:

1. Apparatus for recycling water in a car wash comprising:
    a pump for pumping soiled water from a car wash holding tank;
    a centrifugal separator coupled to the outlet of said pump for receiving soiled water therefrom, cleaned water being conducted to the processed-water outlet of said separator and, by means of said pump, from there to the scrubbing section of said car wash;
    a bypass valve coupling the processed-water outlet of said separator directly to the inlet of said pump to keep said separator continuously operating at high velocity even when no processed water is being used by said car wash; and
    a sludge receptacle coupled to the bottom of said separator.

2. An apparatus according to claim 1 further comprising a vortex breaker and check valve coupled between said separator and said sludge receptacle, said vortex breaker comprising a pipe inclined at an angle to the vertical.

3. Apparatus for recyling water in a car wash comprising:
    a pump for pumping soiled water from a car wash clarifying tank;
    first and second centrifugal separators coupled to the outlet of said pump for receiving soiled water therefrom, cleaned water being conducted from the processed-water outlets of said separators by means of said pump to the scrubbing section of said car wash;
    a bypass valve coupling the processed-water outlets of said separators directly to the inlet of said pump to keep said separators continuously operating at high velocity even when no processed water is being used by said car wash; and
    a sludge receptacle coupled to the bottom of said separators.

4. An apparatus according to claim 3 further comprising a vortex breaker and check valve coupled between said separator and said sludge receptacle, said vortex breaker comprising a pipe inclined at an angle to the vertical.

5. Apparatus for recycling water in a car wash comprising:
    a pump for pumping soiled water from a clarifying tank by way of a foot valve comprising a strainer and check valve disposed in said clarifying tank;
    a high-velocity centrifugal separator coupled to the outlet of said pump for receiving soiled water therefrom, said soiled water whirling downward at high velocity around the inside periphery of said separator, creating a central vortex in said separator from top to bottom, gavity causing soiled particles to fall from the periphery of said separator toward the bottom of said separator, cleaned water being elevated up the central vortex to the processed-water outlet of said separator, said cleaned water being conducted from the processed-water outlet of said separator by means of said pump to the scrubbing section of said car wash;
    a bypass valve coupling the precessed-water outlet of said separator directly to the inlet of said pump to keep said separator continuously operating at high velocity even when no processed water is being supplied to said car wash;
    a pair of water pressure gauges, one of said gauges being connected to the processed-water outlet of said separator, and the other of said gauges being connected to the inlet of said separator;
    a sludge receptacle coupled to the bottom of said separator;
    a priming valve coupled to the inlet of said pump; and
    a float tank and check valve coupled to the processed-water outlet of said separator for expelling trapped air from the system.

6. An apparatus according to claim 5 further comprising a vortex breaker and check valve coupled between said separator and said sludge receptacle, said vortex breaker comprising a pipe inclined at an angle to the vertical.

7. The method for recycling water in a car wash comprising the steps of:
    pumping soiled water from a car wash clarifying tank to a centrifugal separator by means of a pump;
    supplying cleaned water from the processed-water outlet of said separator to the scrubbing section of said car wash by said pump; and
    recirculating cleaned water from the processed-water outlet of said separator directly to the inlet of said pump.

* * * * *